May 16, 1967  J. C. BENDER  3,319,464
TORQUE METER
Original Filed Oct. 24, 1963
2 Sheets-Sheet 1
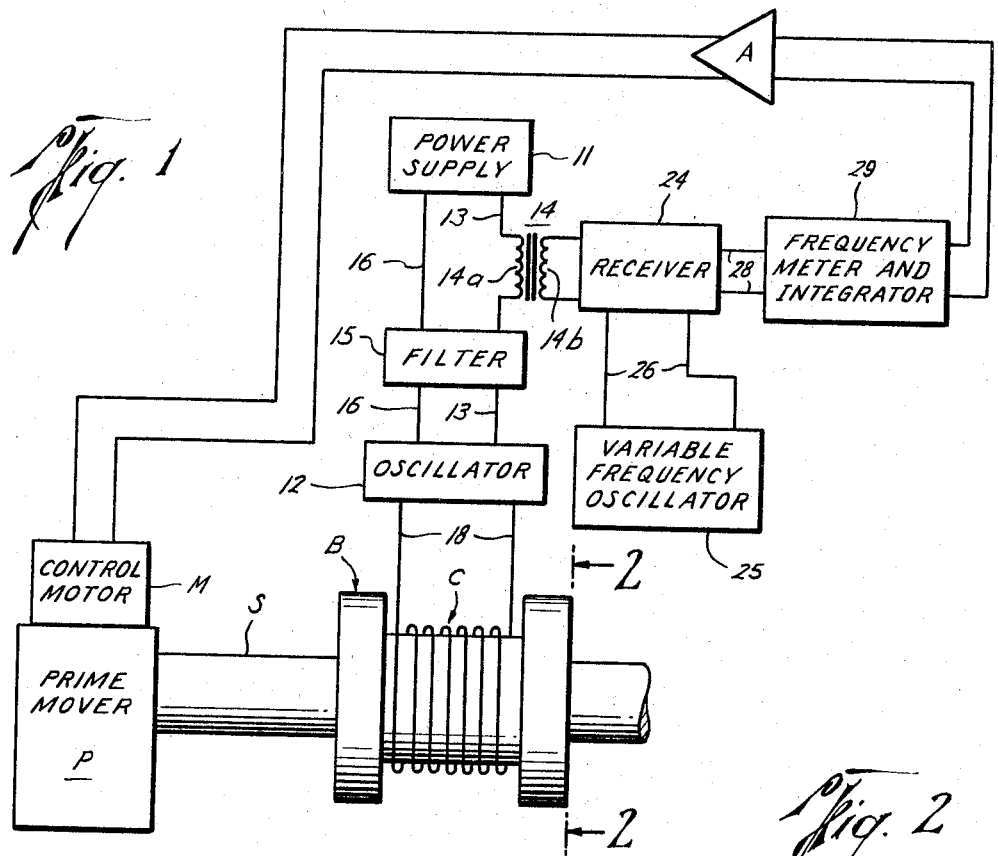
Fig. 1
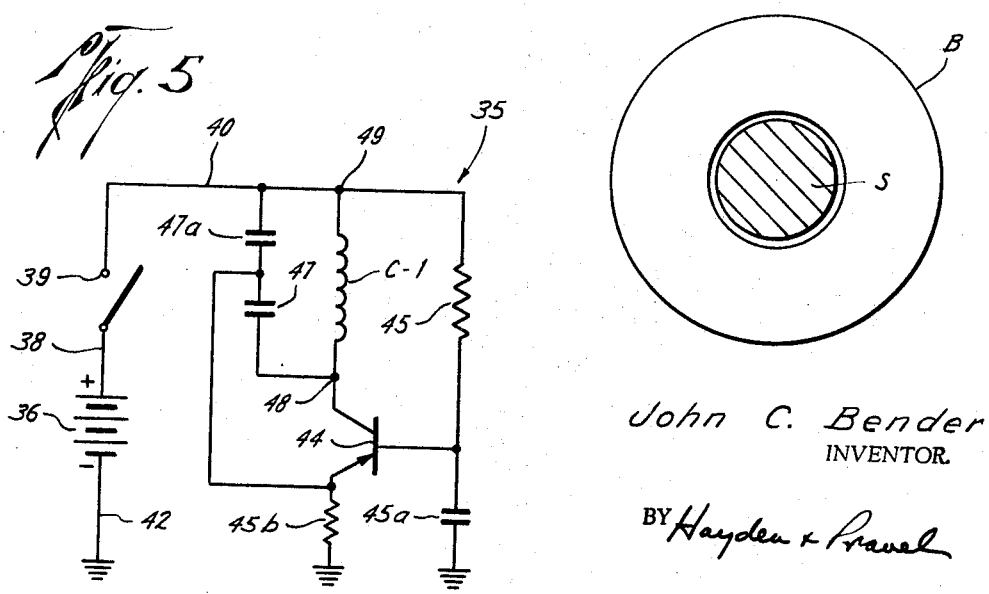
Fig. 2
Fig. 5
John C. Bender
INVENTOR.
BY Hayden & Pravel
ATTORNEYS

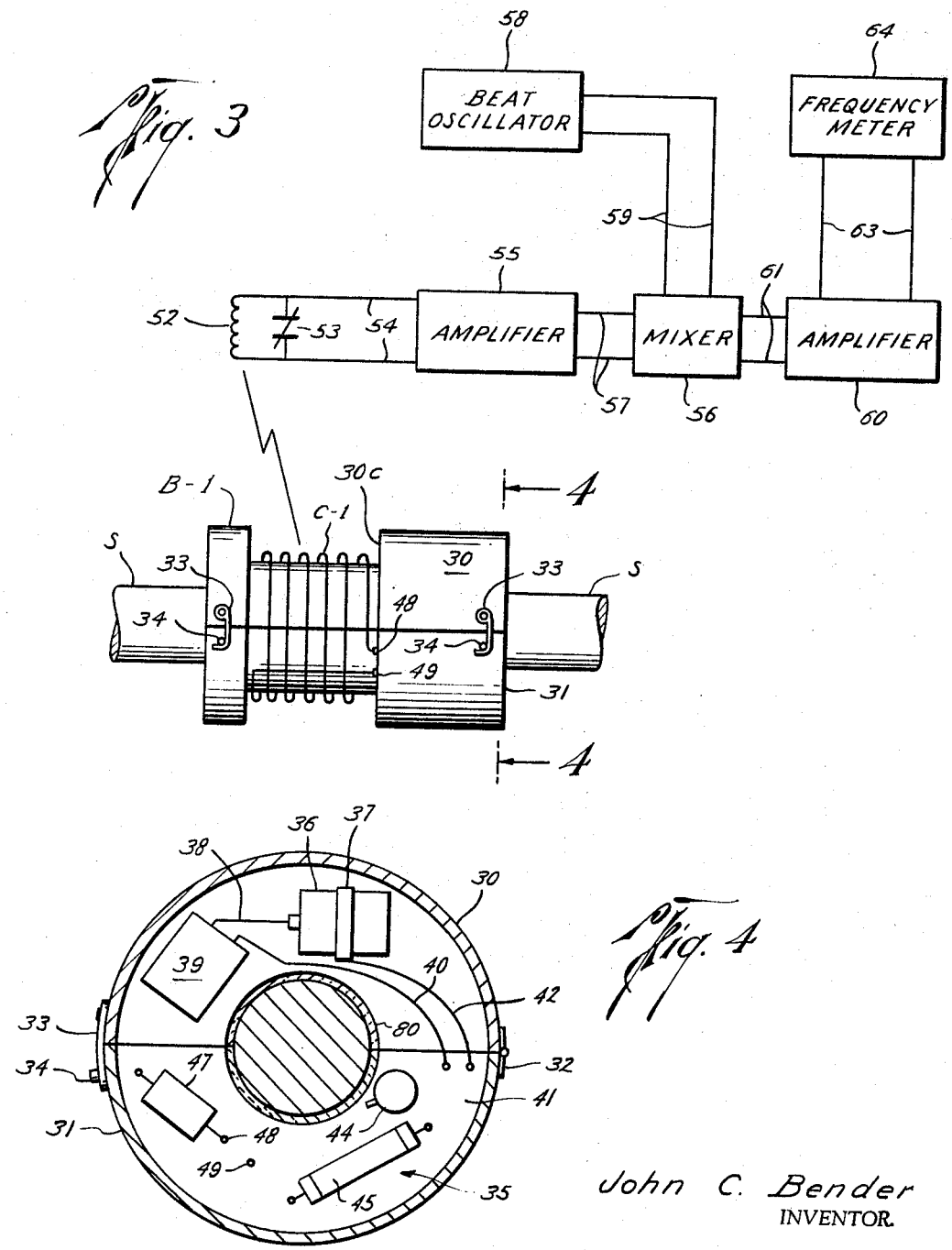

United States Patent Office 3,319,464
Patented May 16, 1967

3,319,464
TORQUE METER
John C. Bender, Houston, Tex., assignor to Mecca Cable
& Service, Inc., a corporation of Texas
Continuation of application Ser. No. 318,721, Oct. 24,
1963. This application July 11, 1966, Ser. No. 565,356
5 Claims. (Cl. 73—136)

This invention relates to torque meters which sense and indicate variations in torque in a rotating shaft or other member and is a continuation of copending application Ser. No. 318,721, filed Oct. 24, 1963 and, now abandoned.

The need often arises to measure torque in a rotating shaft under dynamic conditions and to possibly control the torque in the rotating shaft by increasing or decreasing the power output of the prime mover or other source of torque connected to the shaft. Torque meters constructed in the past for use with rotating shafts have often placed a resistance wire strain gauge or other detection means on the surface of the shaft with glue or some other adhesive to sense minute strain in the structure of the shaft itself. The detection means are then connected to indicating circuitry as is well known in the art to form indications of the stress in the surface of the shaft. The indications of the detection means may be calibrated to directly relate signals from the detection means to the torque in the shaft. Major drawbacks exist in the use of the existing prior art detection means as torque meters, and one such problem relates to the means used to transfer the signal generated by the detection means from the rotating shaft to the stationary indicating circuitry.

The means most frequently utilized in the past have been one form or another of slip rings placed on the shaft and stationary brushes in contact with the slip rings for communication to the stationary indicating circuitry. The signal formed by the detection means attached to the surface of the shaft is transferred by way of the slip rings and brushes to the indicating equipment with the addition of a large amount of noise caused by the frictional, moving contact of the brushes with the rings. The noise caused by the rings and brushes obscures the incremental resistance changes of the strain gauge or other detection means to greatly hamper use of the device and to reduce its accuracy materially. Moreover, prior art systems which have attempted to eliminate the detrimental aspects inherent in the use of slip rings and brushes have required relatively complex and cumbersome indicating means and methods.

It is therefore an object of this invention to provide a new and improved torque meter in which the sensing element detects torque in a revolving member and communicates an indication of the torque to an indicator without using slip rings and brushes.

Another object of this invention is to provide a new and improved torque meter which senses torque in a revolving member and communicates an indication of the torque sensed in the revolving member to an indicator without any physical connection between the indicator and the revolving member.

A further object of this invention is to provide a new and improved torque meter which senses torque in a revolving member and communicates an indication of the torque sensed in the revolving member to an indicator, said communication being completely free of system noise and unaffected by noise from external sources.

Another object of this invention is to provide a new and improved torque meter which senses and indicates torque in a revolving member linearly across a wide range of torque.

Yet another object of this invention is to provide a new and improved torque meter which may be installed to sense torque in a revolving member in place with a minimum of manipulation.

An important object of this invention is to provide a new and improved torque meter which senses torque in a revolving member and provides an indication thereof at a remote point from the revolving member.

Another object of this invention is. to provide a new and improved torque meter which eliminates the need for slip rings and brushes without requiring the use of relatively complex and cumbersome detection and indicating means and methods.

It is also an object of this invention to provide a new and improved torque meter having a reference signal which is independent of and physically disconnected from the revolving member.

Yet another object of this invention is to provide a new and improved torque meter which senses torque in a revolving member and communicates an indication of the torque sensed in the revolving member to an indicator by electromagnetic radiation.

Another object of this invention is to provide a new and improved torque meter wherein the detection system includes a stationary inductance coil circumferentially spaced about a revolving shaft to eliminate physical contact with the revolving shaft.

The preferred embodiment of this invention will be described hereinafter together with other features thereof, and additional objects will become evident from such description.

The invention will be more readily understood from a reading of the following specification and by reference to the accompanying drawings forming a part thereof wherein an example of the invention is shown, and wherein:

FIG. 1 is a schematic block diagram of the invention with the sensor means and the shaft shown in elevation;

FIG. 2 is a sectional view taken along the line 2—2 of FIG. 1;

FIG. 3 is an alternative embodiment of the invention represented in block diagram schematic form with the sensor means and the shaft in elevation;

FIG. 4 is a sectional view taken along the line 4—4 of FIG. 3; and

FIG. 5 is a schematic diagram of a typical oscillator.

In FIG. 1, a prime mover P turns and simultaneously applies torque to a shaft S. A coil C is wound on a spool B which is slidably and rotatably placed on the shaft S. The coil C is connected to an oscillator 12 as a portion of a wave-forming electrical circuit, to be described, in which the inductance of the coil C is related to the frequency of the signal generated by the oscillator 12. With this invention, variations in torque in the shaft S alter the frequency of the signal generated by the oscillator 12, which alteration may be sensed for visual inspection or other observation. The signal generated by the oscillator 12 is unaffected by either external or system noise because the information contained in the signal frequency is not obscured or altered by the noise.

Considering the invention more in detail, the prime mover P may be any prime mover adapted to impart rotative motion to the shaft S whereby shaft S may be continuously rotatable through any desired number of revolutions. The shaft S transfers rotational motion from the prime mover P to some load (not shown) in accord with the purpose of the prime mover P. The shaft S may be of any diameter and may be driven at any angular velocity. Also, the shaft S may be hollow or solid, and is fabricated of some ferrous material. The spool or bobbin B placed on the shaft S supports the coil C in a controlled spatial relationship with the shaft S whereby coil C is circumferentially spaced about the shaft S and completely out of contact therewith. The coil C is preferably secured against rotation with the shaft S as the shaft S turns by securing the bobbin B to a base or other fixed support. Contact between the shaft S and the bobbin B is thus eliminated by constructing the spool B with an inner diameter larger than the external diameter of the shaft S as seen in FIG. 2.

The coil C may be wound of any desired number of turns of wire on the bobbin B, the wire gauge being determined by the current carried by the wire. The bobbin B is of an electrical nonconductor such as phenolformaldehyde or any other suitable electrical insulating material.

A power supply 11 supplies B+ voltage through a wire 13 for the oscillator 12. The wire 13 is connected to the primary 14a of a transformer 14 and then to a filter 15. The conducting path through the filter 15 is continued by the wire 13 to the oscillator 12 to provide B+ voltage for the oscillator 12. A ground return wire 16 is provided from the power supply through the filter 15 to the oscillator 12 to complete the circuit. The oscillator 12 is preferably of the type which includes a coil in the waveforming portion of the circuit and which forms an oscillatory signal in the B+ lead. As an example, the oscillator 12 may include a triode tube which forms oscillations at the plate of the tube which are passed through the primary 14a of the transformer 14. The coil C is connected by a pair of leads 18 to the oscillator 12 for operation as stated to generate an oscillatory signal flowing in the wire 13. The filter 15 attenuates or reduces the amplitude of the signal flowing in the wire 13 for purposes to be set forth hereinafter.

The signal in the primary 14a of the transformer 14 is reproduced across the terminals of the secondary 14b of that transformer which is connected to the input of a receiver 24. The receiver 24 may be similar to any commercial AM or "ham" radio receiver and preferably operates by the superheterodyne principle. A beat or variable frequency oscillator 25 is connected by a pair of wires 26 to the receiver 24 to operate in place of the local oscillator of the receiver 24 by providing a signal to be mixed with the signal produced across the secondary of the transformer 14. The two signals are beat together in the customary manner and the difference between the frequencies of the two signals is amplified and reproduced at a pair of wires 28. The output wires 28 are connected to a frequency meter 29 having a self-contained integrating circuit which indicates to an observer the frequency of the signal connected thereto. The integrated output of the meter 29 is connected to a servoamplifier A which amplifies the signal from the meter 29 in the conventional manner. The amplified signal is applied to a servo control motor M which is connected to the prime mover P. The motor M may be connected to regulate the power output of the prime mover P by altering the fuel supplied to the prime mover P, or by any other means.

The equipment may be installed to sense torque in a shaft by placing the bobbin B on the shaft between the prime mover P and the load acting on the shaft to sense the torque in the shaft. The torque in the shaft S alters the permeability of the metal of the shaft to vary the inductance of the coil C. Since coil C is connected in the wave-forming portion of the oscillator 12, a change in its inductance changes the frequency of the signal generated by the oscillator 12 in the conductor 13. The signal generated by the oscillator 12 is applied to the transformer 14 which reproduces that signal across the terminals of the secondary 14b at the frequency controlled by the coil C. While it is intended that the transformer 14 serve as input means for the receiver 24, it is possible for the signals in the receiver 24 to feed back through the transformer 14 into the conductor 13. The filter 15 reduces the amplitude of such signals in the conductor 13 to prevent the oscillator 12 from locking on the signals spuriously reproduced in the wire 13 from the receiver 24.

The frequency of the oscillator 12 is preferably in the range of 50,000 c.p.s. to about 300,000 c.p.s., as determined by the number of turns in the coil C. As previously mentioned, the inductance of the coil is materially affected by the reluctance of the paths of the lines of magnetic flux, which reluctance is materially reduced by the metallic shaft S. As the shaft S is stressed, the inductance of the coil C is altered to vary the frequency of the signal generated by the oscillator 12. The signal is conducted by the wire 13 through the transformer primary 14a and then to the receiver 24. The beat oscillator 25 may be adjusted to some frequency before the shaft S is stressed, in which case the difference signal connected to the frequency meter 29 by the wires 28 represents a reference level for calibration purposes. It may be appreciated that the reference signal supplied by the oscillator 25 is independent of and unconnected with the shaft S. The meter 29 may be calibrated in terms of frequency or it may be calibrated in units of torque by ascertaining the amount of torque in the shaft S for two or three different indications on the meter 29. The output conductors 28 are connected to the servo loop to provide means regulating the fuel supplied to the prime mover P to control the torque in the shaft S. As an example, the variable frequency oscillator 25 may be provided with a variable frequency control calibrated in terms of torque generated by the prime mover P. The difference signal created by mixing of the two input signals in the receiver 24 would then represent deviation from the desired torque output for the prime mover P and the actual torque output of the prime mover P. This signal is applied to the motor M to regulate the fuel supply or to regulate a governor attached to the prime mover P to regulate the power output of the prime mover P.

In operation, the apparatus is installed with the bobbin B circumferentially spaced about the shaft S. The prime mover rotates the shaft S under an initial set of conditions which preferably include zero torque placed on the shaft S or at least a torque value which is known. The initial permeability of the shaft S has a corresponding frequency of the signal generated by the oscillator 12 which is connected to the receiver 24 for beating with the signal generated by the oscillator 25. The output signal of the receiver 24 is connected to the frequency meter 29 and then to the amplifier A which sense the reference indication for the initial conditions. The load on the shaft S may then be varied to alter the torque acting against the shaft S in which event the frequency of the signal generated by the oscillator 12 is varied to some different value. The altered signal is conducted to the receiver 24 and is mixed with the signal generated by the oscillator 25 to form a different output signal in the wires 28 for the frequency meter 29 and the amplifier A. The different output signal causes the frequency meter 29 to indicate a different reading to an observer representative of the different torque in the shaft S and the amplifier A will drive the motor M to return the torque in the shaft S to the desired level. Other torques in the shaft S will cause various other readings of the meter 29 and different signals amplified by the amplifier A in accordance with the torque placed in the shaft S.

It may therefore be appreciated that the invention as exemplified in FIGS. 1 and 2 provides a means for measuring torque in a revolving shaft without the use of slip rings and brushes and, moreover, accomplishes this objective with a minimum amount of circuitry and equipment consistent with accurate measurement. Further, it should also be noted that the reference signal provided by the variable frequency oscillator 25 is unconnected with and independent of the physical and electrical characteristics of the revolving shaft S. This latter feature increases the mobility and versatility of the torque meter as contrasted with a bridge-type detection circuit in that the bridge-type circuit requires the simultaneous use of a second unstressed shaft or an unstressed portion of the shaft being tested to act as a reference in the balance arm of the bridge. The torque meter of the present invention may be employed in the measurement of torque in a large variety of shafts having wide ranges of magnetic properties and physical dimensions. As before noted, calibration of the torque meter of the present invention requires only that the variable frequency oscillator be adjusted to provide an indication of zero torque when the shaft to be metered is in an unstressed condition, thereby obviating the need for simultaneous comparison between two shafts, or two portions of the same shaft, as is required in balance-type or bridge-type detection circuits.

An additional embodiment of the invention is shown in FIG. 3 where a bobbin B–1 is placed or mounted on the shaft S. The bobbin B–1 is longitudinally split to define an upper semicylindrical half 30 and the lower semicylindrical half 31. FIG. 4 shows that the halves 30 and 31 of the bobbin B–1 are pivotally joined at a hinge 32 extending along one edge of the separation to enable the two portions of the bobbin B–1 to open and close relative to one another to enable the spool to be placed on the shaft S without being passed over one end thereof.

After the bobbin B–1 is placed about or around the shaft S and two portions 30 and 31 are brought together, a pair of hooks 33 is engaged with extending pins 34 to latch or clasp the portions 30 and 31 of the bobbin B–1 together. The bobbin B–1 is preferably hollow at one end and has mounted therein the components of an oscillator 35. The oscillator 35 may be of any conventional configuration which includes a coil in the wave-forming portion thereof.

By way of example, typical oscillator components are shown mounted in the bobbin B–1 in FIG. 4 and include a battery 36 secured by a strap 37 to the bobbin B–1. The battery 36 is connected by a wire 38 to a centrifugal switch 39 and thereafter by a wire 40 to a terminal board 41 mounted in the lower portion 31 of the bobbin B–1. The low voltage side of the battery 36 is connected by a wire 42 to the same terminal board 41 to complete a power supply system for the oscillator mounted on the terminal mounting board 41. A transistor 44 and a resistor 45 form portions of the oscillator 35 and are shown mounted on the board 41. A capacitor 47 is shown mounted above the board 41 and is connected to a terminal 48.

The terminal 48 extends through the inner shoulder 30c of the bobbin B–1 to provide a point of connection for a coil C–1 placed on the bobbin B–1. The coil C–1 is wound about the bobbin B–1 and the remaining end of the wire forming the coil C–1 is connected to a terminal 49 similar to the terminal 48 which feeds through the inner face or shoulder 30c of the bobbin B–1 to the hollow portion thereof to connect the coil C–1 into the circuitry of the oscillator 35. While the oscillator 35 is any conventional oscillator, the components of one such oscillator are shown in a schematic electrical diagram in FIG. 5. The oscillator components illustrated in FIG. 4 are included in the circuit of FIG. 5, and additionally, such circuit includes the coil C–1 and capacitors 47 and 47a which form a collector tuned circuit, while base bias is provided by the resistor 45. The base is grounded through a capacitor 45a and the emitter is grounded through a resistor 45b. Since oscillatory current flows through the coil C–1, an oscillatory magnetic field is formed about the bobbin B–1. Such additional components shown in FIG. 5, but omitted from FIG. 4, may be mounted inside the bobbin B–1 or externally thereof, as will be evident to those skilled in the art.

The coil C–1 forms magnetic lines of flux which are concentrated in the structure of the rotating or turning shaft S when the oscillator 35 generates an oscillatory signal in the coil. A tuned circuit, comprised of a coil 52 and a capacitor 53, which may be thought of as an antenna, is placed within the field of radiations of the coil C–1 to sense or detect radiation from the coil C–1. A pair of wires or conductors 54 is connected to coil 52 and the capacitor 53 to provide an input for an amplifier 55 which amplifies the signal to a predetermined level.

The amplifier 55 is connected to a mixer 56 by a pair of conductors 57 as a means of transferring the signal generated by the oscillator 35 to the mixer 56. A beat oscillator 58 is connected to the mixer 56 by a pair of cables 59 to provide a signal having a reference condition for comparison with and contrast against the signal generated by the oscillator 35. The mixer 56 mixes the two signals to define an output signal including a signal having a frequency equal to the difference of the two imput signals. The output signal of the mixer 56 is conducted by a pair of wires 61 to an output amplifier 60 for further amplification to form an output signal in the wire 63. The wires 63 are thereafter connected to a frequency meter 64 which indicates to an observer the frequency difference of the two input signals to the mixer 57 by the conductor pairs 57 and 59.

The embodiment disclosed in FIG. 3 is mounted or installed on a shaft transferring torque from a prime mover to some load as hereinbefore described. When the prime mover is operated to rotate the shaft S, the centrifugal switch 39 of the oscillator 35 operates at sufficient angular velocity to connect the battery 36 to the oscillator 35 contained in the hollow portion of the bobbin B–1. When the centrifugal switch 39 does operate, the oscillator 35 is rendered operative to flow pulsating current through the coil C–1 and to form a pulsating magnetic field thereabout. The inductance of the coil C–1 is, of course, determined by the reluctance of the path of the magnetic lines of flux which is altered or affected by the permeability of the metal of the shaft S, which in turn is altered as a result of torque forces on the shaft. Therefore, a given stress in the shaft S, which may be zero or some selected value, serves to define a reference inductance for the coil C–1 to cause the oscillator 35 to oscillate at a reference frequency. The tuned circuit comprised in the inductor 52 and the capacitor 53 is tuned to the frequency range of the oscillator 35 to provide an input signal in the wires 54 for the amplifier 55. The amplifier 55 amplifiers the signal detected from the coil C–1 and applies it to the wires 57 conducting the signal to the mixer 56. The beat oscillator is initially adjusted to some frequency equal to or near the reference frequency of the oscillator 35. The mixer 56 forms the output signal defined by the two input signals as the difference between the frequency of the two input signals and applies said output signal to the amplifier 60 for further amplification. The frequency meter 64 is connected to the amplifier 60 and responds as previously mentioned to the frequency of the signal provided by the mixer 56.

In operation, the bobbin B–1 fits snugly or tightly about the shaft S so that relative rotation between the two is limited by the fit of the bobbin B–1 on the shaft S to cause the bobbin B–1 to rotate with the shaft S. Thus, on actuation of the prime mover connected to the shaft S, the shaft S will rotate and carry the bobbin B–1 at the same relative angular velocity.

The beat oscillator 58 may be adjusted to the frequency of the oscillator 35 corresponding to zero or minimum torque in the shaft S so that the mixer 56 will produce a null or zero frequency output when the two signal are equal in frequency. On the other hand, the beat oscillator 58 may be adjusted to some arbitrary frequency displaced from the frequency of the oscillator 35 to zero or minimum torque in the shaft S so that zero or minimum torque is represented by some frequency which causes the frequency meter 64 to deflect to a value representative thereof. The initial deflection of the frequency meter 64 in this case would define the zero or minimum torque reading which acts as a reference for all other readings taken from the frequency meter 64. On torquing the shaft S to produce stress in the structure thereof, the permeability of the shaft S is altered to vary the inductance of the coil C–1 to change the frequency of the signal generated by the oscillator 35. The altered frequency generated by the oscillator 35 is detected by the 52 and applied to the mixed 56 by the amplifier 55 to be mixed with the known signal generated by the beat oscillator 58. The difference between the known reference signal and the signal produced by the oscillator 35 will deflect the frequency meter 64 differently, to a different point on the scale of the meter to indicate a change in the stress placed in the shaft S. The frequency meter 64 may then be calibrated to read in terms or torque for a given installation by observing the deflection of the frequency meter for known variations in torque loads placed on the shaft S.

Certain alterations may be made in the invention without departing from the spirit thereof. As an example, the circuit shown in FIG. 1 for generating the signal having a frequency dependent upon the permeability of the shaft S may be altered to provide the oscillatory signal in a conductor other than the B+ conductor as shown. Thus, the oscillatory signal may be taken from the wave-forming portion of the oscillator 12 and passed through a cathode or emitter follower and thence to a transformer for connection to the receiver 24. The receiver 24 may be fully utilized, but if the amplitude of the oscillations supplied by the transformer 14 is sufficient, the amplification stages of the receiver 24 may not be necessary to boost the signal to the proper level. Likewise, the output signal of the receiver 24 may have sufficient amplitude so that amplification for operation of the frequency meter 29 is not required. The frequency meter 29 may be any frequency meter supplied commercially and includes devices which indicate frequency by deflection of a needle across a scale and also includes devices which record the frequency on paper tape or other permanent records. A further alteration of the invention as shown in FIG. 1 would include placing ball bearings or other friction reducing means between the shaft S and the bobbin B to reduce friction and vibration to prolong the life of the bobbin B. The bobbin B may then be held by a brace or some other mounting means in a stationary position. Also, the servo loop amplifier A and motor M may be omitted if regulated control is not desired.

The embodiment disclosed in FIGS. 3 and 4 may be altered in many of the same ways mentioned in reference to FIGS. 1 and 2. Also, the bobbin B–1 of this embodiment may be integral with the shaft S or assembled from components having different shapes from the semicylindrical sleeves forming the split bobbin B–1. As an example, unitary or integral construction of the bobbin B–1 may be desirable if the bobbin B–1 can be readily mounted on a given shaft S without being split into two or more sections. The centrifugal switch 39 may be deleted if it is desirable to have the oscillator 35 operate continuously, and an additional battery may be placed in the hollow portion of the bobbin B–1 in place of the centrifugal switch 39 to provide additional power for continuous operation. The bobbin B–1 may be made in more than two portions in which case additional connective means between the portions would be provided. If desired, the portions might be secured together by means of a strap or straps placed around or about the bobbin B–1 to secure the portions in a working relationship on the shaft S. Also, the arrangement of the components in the hollow portion of the bobbin B–1 is subject to change according to the type of oscillator used and the physical size of the components of the oscillator 35. The amplifiers 55 and 60 may be deleted if the signals which they amplify have adequate amplitude without additional application. The frequency meter 64 may be any one of the devices mentioned in reference to the embodiment disclosed in FIGS. 1 and 2, and, of course, a servo loop may be connected to operate a prime mover for the shaft S.

Certain alterations in the embodiment disclosed in FIGS. 3 and 4 may be incorporated to prevent temperature drift if such is a problem. Drift occurs when the transistor itself is subjected to a change in temperature and may become excessive if the bobbin B–1 is installed in a hot environment. The transistor 44 may be mounted on the exterior of the bobbin B–1 for exposure to the air which moves relatively past the bobbin. Or, air scoops may be installed on the bobbin B–1 to gather cooling air for the transistor 44 and other components. If the shaft S tends to conduct heat to the bobbin B–1, insulation 80 placed beneath the bobbin B–1 may prevent overheating and frequency drift. Another possibility lies in constructing the beat oscillator 58 with a similar circuit and exposing it to the same temperature variations so that both oscillators drift together. If the oscillator 35 is to be constantly used in a constantly hot environment, the drift might be accounted for by calibrating the frequency meter 64 after the system has warmed up and ceased drifting.

The foregoing disclosure and description of the invention are illustrative and explanatory thereof, and various changes in the size, shape, and materials as well as in the details of the illustrated construction may be made within the scope of the appended claims without departing from the spirit of the invention.

What is claimed is:
1. A torque meter for measuring the torque in a revolving shaft, comprising:
 (a) first oscillator means including an inductance coil for generating a first signal related to the impedance of said coil; said impedance varying with the permeability of the shaft and said permeability varying with the torque in the shaft;
 (b) said inductance coil being fixed in spaced relation about the shaft;
 (c) detecting means physically unconnected with the shaft for detecting said first signal;
 (d) second oscillator means removed from the shaft and unconnected with the shaft for generating a second constant reference signal;
 (e) comparator circuit means for comparing said first signal and said second reference signal;
 (f) communicating means for communicating said first and second signals to said comparator circuit means; and
 (g) indicator means associated with said comparator circuit means for indicating the difference in said first and second signals to indicate variations of torque in the shaft.
2. The invention of claim 1 above wherein said inductance coil is stationary and is circumferentially spaced from the shaft to permit relative motion between the shaft and said coil.
3. The invention of claim 1 above including control means cooperating with a prime mover connected to the shaft and means conveying the output of said comparator circuit means to said control means for operating the prime mover in relation to the torque in the shaft.
4. The invention of claim 1 above wherein said first oscillator means is securely mounted on the shaft for rotation therewith and wherein said communicating means comprises electromagnetic coupling between said first oscillator means and said means for detecting said first signal.
5. The invention of claim 4 including housing means carrying said first oscillator means removably mounted on the shaft and further including switch means responsive to the angular velocity of the shaft for activating said first oscillator means.

References Cited by the Examiner
UNITED STATES PATENTS

| | | | |
|---|---|---|---|
| 2,053,560 | 9/1936 | Janovsky | 73—141 |
| 2,557,393 | 6/1951 | Rifenbergh | 73—136 |
| 3,000,208 | 9/1961 | Piazza | 73—136 |
| 3,142,981 | 8/1964 | Gross | 73—141 |

RICHARD C. QUEISSER, *Primary Examiner.*

C. A. RUEHL, *Assistant Examiner.*